US008670162B2

(12) United States Patent
Hoshino (10) Patent No.: US 8,670,162 B2
(45) Date of Patent: Mar. 11, 2014

(54) FACSIMILE JOB MANAGING APPARATUS, FACSIMILE TRANSMISSION PROCESSING METHOD, AND FACSIMILE TRANSMISSION PROCESSING SYSTEM

(75) Inventor: Naoki Hoshino, Saitama-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 427 days.

(21) Appl. No.: 13/049,007

(22) Filed: Mar. 16, 2011

(65) Prior Publication Data

US 2011/0228346 A1   Sep. 22, 2011

Related U.S. Application Data

(60) Provisional application No. 61/314,667, filed on Mar. 17, 2010.

(51) Int. Cl.
*H04N 1/32* (2006.01)

(52) U.S. Cl.
USPC ............... 358/442; 358/405; 379/100.05

(58) Field of Classification Search
USPC ........ 358/1.1, 1.13–1.16, 402–405, 407, 440, 358/442; 379/100.01, 100.05, 100.08, 379/100.09, 100.15, 201.01
See application file for complete search history.

(56) References Cited

U.S. PATENT DOCUMENTS

| | | | | |
|---|---|---|---|---|
| 6,154,290 | A * | 11/2000 | Makita | 358/440 |
| 8,223,370 | B2 * | 7/2012 | Kawano | 358/1.15 |
| 2002/0105955 | A1 * | 8/2002 | Roberts et al. | 370/401 |
| 2002/0126321 | A1 * | 9/2002 | Trachtman | 358/407 |
| 2002/0156923 | A1 * | 10/2002 | Tanimoto | 709/246 |
| 2007/0206754 | A1 * | 9/2007 | Ueda et al. | 379/201.01 |
| 2007/0291284 | A1 * | 12/2007 | Kittaka et al. | 358/1.1 |
| 2008/0130052 | A1 * | 6/2008 | Oguri | 358/1.16 |
| 2009/0122342 | A1 * | 5/2009 | Kawano | 358/1.15 |
| 2009/0201544 | A1 * | 8/2009 | Kumakura et al. | 358/1.15 |
| 2009/0316206 | A1 | 12/2009 | Anezaki et al. | |
| 2010/0079780 | A1 * | 4/2010 | Lee | 358/1.13 |
| 2013/0050738 | A1 * | 2/2013 | Uchikawa | 358/1.14 |

FOREIGN PATENT DOCUMENTS

| | | | | |
|---|---|---|---|---|
| JP | 06318998 | A * | 11/1994 | H04N 1/00 |
| JP | 2004-072131 | | 3/2004 | |
| JP | 2005-119095 | | 5/2005 | |
| JP | 2007266893 | A * | 10/2007 | |
| JP | 2009124315 | A * | 6/2009 | |

* cited by examiner

*Primary Examiner* — Kimberly A Williams
(74) *Attorney, Agent, or Firm* — Turocy & Watson, LLP

(57) ABSTRACT

According to one embodiment, a facsimile job managing apparatus includes a storing unit, a storage control unit, a history-display-user-interface providing unit, and a transmission processing unit. The storage control unit causes the storing unit to store image data transmitted by facsimile and the outcome of the facsimile transmission processing in association with each other. The history-display-user-interface providing unit provides a client terminal with a history display user interface for acquiring the image data transmitted by facsimile and the outcome of the facsimile transmission processing from the storing unit, displaying a thumbnail image of the image data transmitted by facsimile and outcome information indicating the outcome of the facsimile transmission processing in association with each other, and displaying a retransmission button in association with a thumbnail image of image data unsuccessfully transmitted by facsimile. If the retransmission button is selected in the client terminal, the transmission processing unit transmits image data corresponding to a thumbnail image related to the retransmission button by facsimile.

18 Claims, 13 Drawing Sheets

| USER ID | DATE AND TIME | IMAGE DATA NAME | TRANSMISSION OUTCOME | IMAGE DATA | FAX TRANSMISSION SETTING |
|---|---|---|---|---|---|
| tanaka | 2009/02/25 12:50 | 03325873859 | SUCCESSFUL | ONLY FIRST PAGE | |
| tanaka | 2009/03/12 14:53 | 06325873888 | SUCCESSFUL | ONLY FIRST PAGE | |
| tanaka | 2009/03/25 16:26 | 06325873889 | UNSUCCESSFUL | ALL PAGES | TELEPHONE NUMBER○×☐···· , RESOLUTION400dpi,···· |
| ···· | ···· | ···· | ···· | ···· | ···· |

FIG. 13

FACSIMILE JOB MANAGING APPARATUS, FACSIMILE TRANSMISSION PROCESSING METHOD, AND FACSIMILE TRANSMISSION PROCESSING SYSTEM

CROSS-REFERENCE TO RELATED APPLICATION

This application is based upon and claims the benefit of priority from U.S. provisional application 61/314,667, filed on Mar. 17, 2010; the entire contents of which are incorporated herein by reference.

FIELD

Embodiments described herein relate generally to a facsimile transmission processing technique for transmitting image data by facsimile again.

BACKGROUND

In the past, a facsimile transmission system is known in which a MFP (Multi Function Peripheral) having a function of a server transmits image data, which is transmitted from a client terminal such as a PC (Personal Computer), to a facsimile apparatus by facsimile. In the facsimile transmission system, the MFP functioning as the server provides the client terminal with a web page in which a transmission history of the image data transmitted by facsimile is displayed. A user can check, for example, unsuccessful facsimile transmission processing by operating the client terminal and looking at the web page.

However, in the system in the past, when image data related to unsuccessful facsimile transmission processing is retransmitted, it is necessary to perform transmission work again from the beginning. For example, it is necessary to cause the MFP functioning as the server to read a document again and generate image data and, at the same time, perform transmission setting again. Therefore, the system in the past requires time and labor to transmit the image data by facsimile again.

Since a web page for a transmission history in the past includes only transmission date and time and a destination (a telephone number or an e-mail address), it is unknown from the web page what kind of image data the MFP functioning as the server transmits by facsimile. Therefore, the system in the past is inconvenient because, when the image data is retransmitted, it is necessary to recall a document transmitted by facsimile before.

DETAILED DESCRIPTION

In general, according to an embodiment, a facsimile job managing apparatus includes a storing unit, a storage control unit, a history-display-user-interface providing unit, and a transmission processing unit. The storage control unit causes the storing unit to store image data transmitted by facsimile and the outcome of the facsimile transmission processing in association with each other. The history-display-user-interface providing unit provides a history display user interface for acquiring the image data transmitted by facsimile and the outcome of the facsimile transmission processing from the storing unit, displaying a thumbnail image of the image data transmitted by facsimile and outcome information indicating the outcome of the facsimile transmission processing in association with each other, and displaying a retransmission button in association with a thumbnail image of image data unsuccessfully transmitted by facsimile. If the retransmission button is selected, the transmission processing unit transmits image data corresponding to a thumbnail image related to the retransmission button by facsimile.

In general, according to another embodiment, a facsimile transmission processing method is a facsimile transmission processing method by a facsimile job managing apparatus including a storing unit. The facsimile transmission processing method includes causing the storing unit to store image data transmitted by facsimile and the outcome of the facsimile transmission processing in association with each other. The facsimile transmission processing method includes providing a client terminal with a history display user interface for acquiring the image data transmitted by facsimile and the outcome of the facsimile transmission processing from the storing unit, displaying a thumbnail image of the image data transmitted by facsimile and outcome information indicating the outcome of the facsimile transmission processing in association with each other, and displaying a retransmission button in association with a thumbnail image of image data unsuccessfully transmitted by facsimile. The facsimile transmission processing method includes transmitting, if the retransmission button is selected in the client terminal, image data corresponding to a thumbnail image related to the retransmission button by facsimile.

First Embodiment

An embodiment is explained below with reference to the accompanying drawings.

Figure 1:
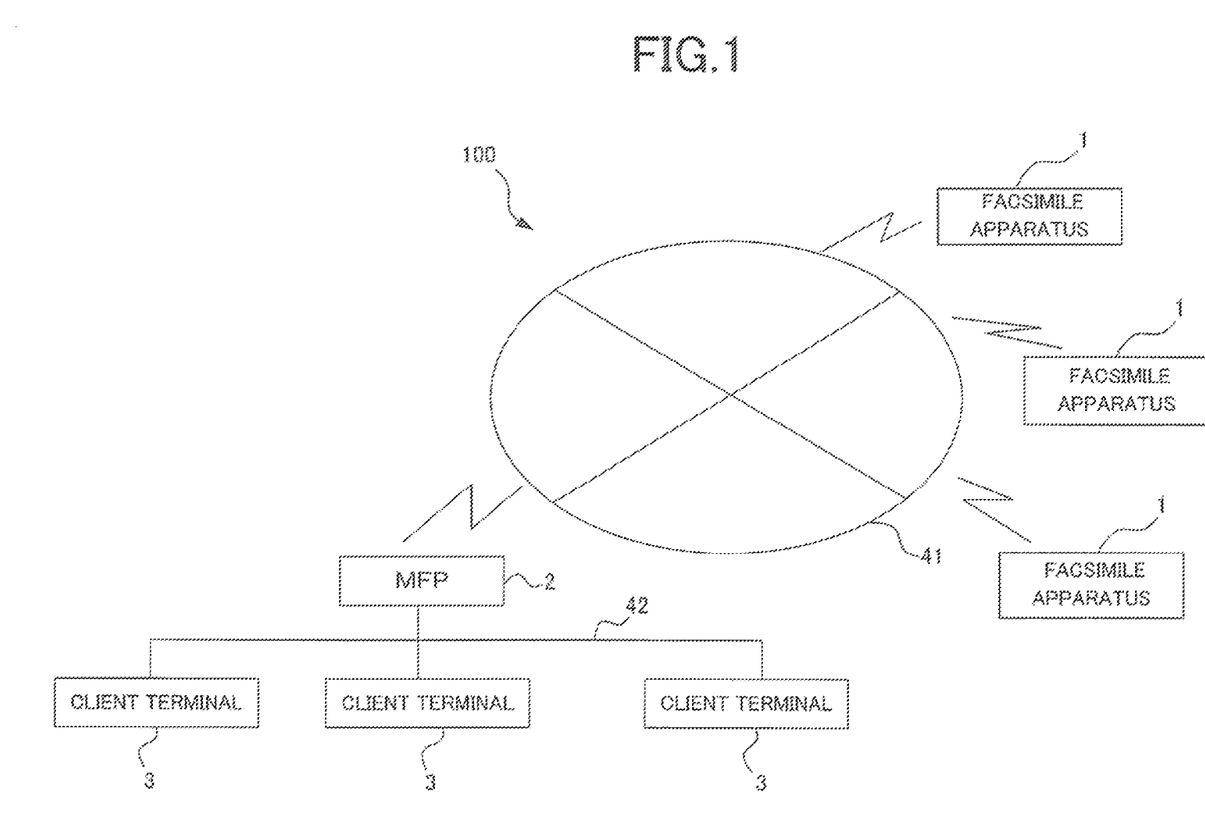
FIG. 1 is a diagram of the configuration of a facsimile transmission processing system.

FIG. 1 is a diagram of the configuration of a facsimile transmission processing system 100.

The facsimile transmission processing system 100 includes plural facsimile apparatuses 1 such as MFPs, a MFP (a facsimile job managing apparatus) 2 connected to the plural facsimile apparatuses 1 via an electric communication line 41 such as a telephone line or the Internet and having a function of a server, and plural client terminals 3 such as PCs (Personal Computers) connected to the MFP 2 via an electric communication line 42 such as a LAN. The electric communication line 42 may be a telephone line or the Internet besides the LAN.

The facsimile apparatus 1 receives a facsimile job transmitted by facsimile from the client terminal 3 through the MFP 2 functioning as the server and forms an image on a sheet on the basis of the facsimile job.

Figure 2:
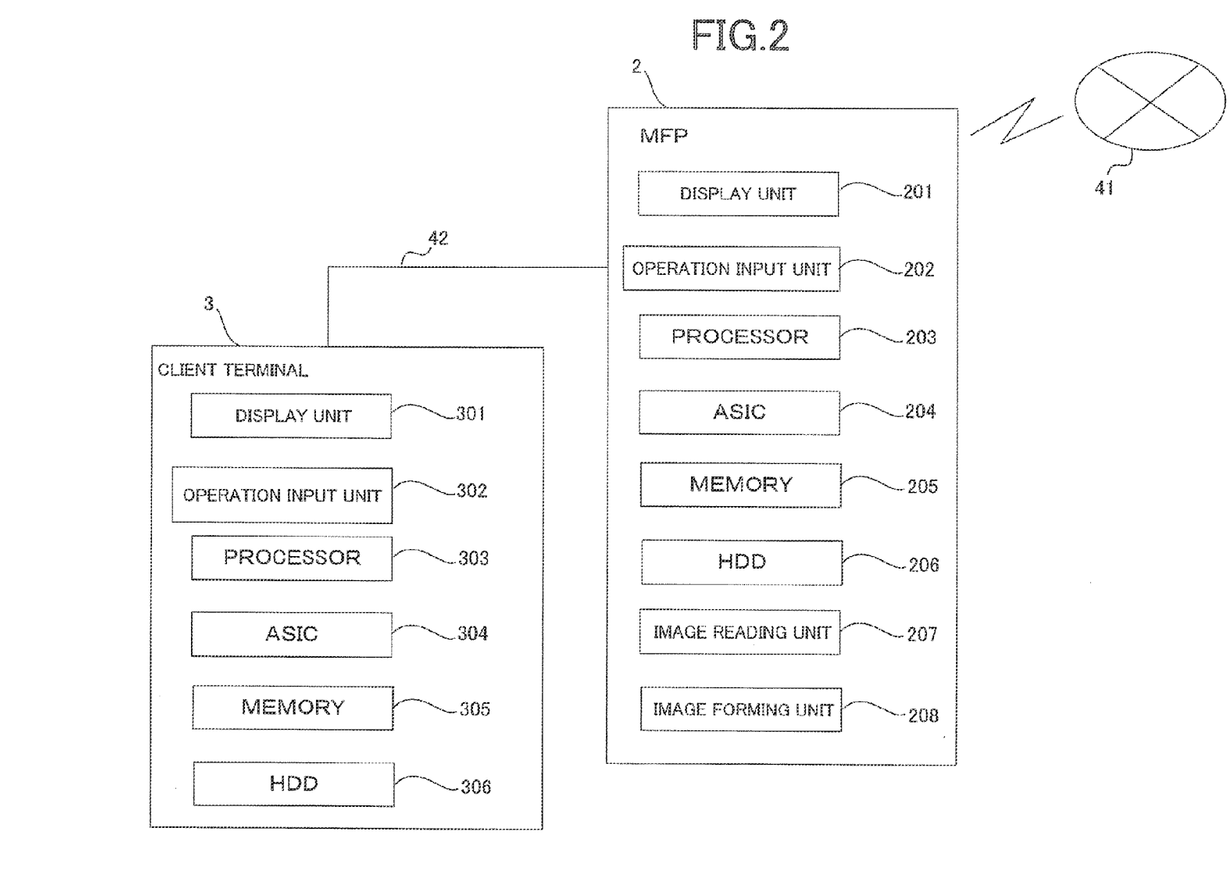
FIG. 2 is a block diagram of the configurations of a MFP and a client terminal.

FIG. 2 is a block diagram of the configurations of the MFP 2 and the client terminal 3.

The MFP 2 includes a display unit 201, an operation input unit 202, a processor 203, an ASIC (Application Specific Integrated Circuit) 204, a memory (a storing unit) 205, a HDD (Hard Disk Drive) 206, an image reading unit 207 functioning as an ADF (Auto Document Feeder), and an image forming unit 208. The display unit 201 may be an LCD (Liquid Crystal Display). The operation input unit 202 may be a keyboard or a mouse. The display unit 201 and the operation input unit 202 may be integrated on a touch panel. The processor 203 may be a CPU (Central Processing Unit). The processor 203 executes a computer program stored in the memory 205 and realizes various functions. The memory 205 may be a RAM (Random Access Memory) or a ROM (Read Only Memory). The image forming unit 208 reads an original document and generates image data. The image forming unit 208 forms the image data on a sheet.

The client terminal 3 includes a display unit 301, an operation input unit 302, a processor 303, an ASIC 304, a memory (a storing unit) 305, and an HDD 306 same as those of the MFP 2.

Figure 3:
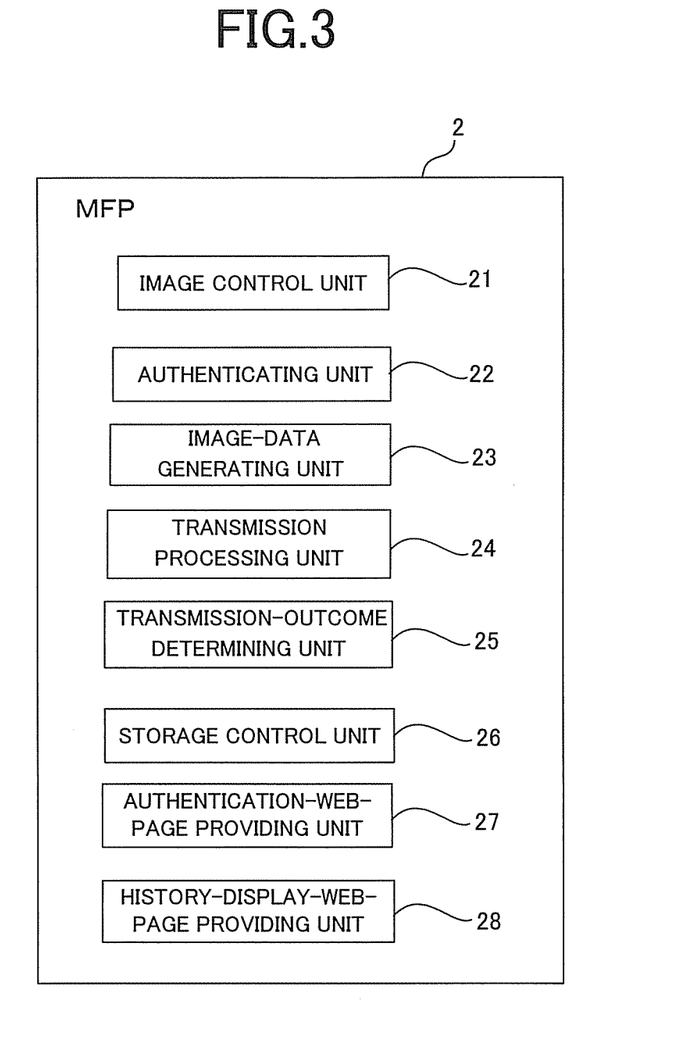
FIG. 3 is a functional block diagram of the MFP.

FIG. 3 is a functional block diagram of the MFP 2.

The MFP 2 includes, as functional units realized by the processor 203 reading the computer program stored in the memory 205, a screen control unit 21, an authenticating unit 22, an image-data generating unit 23, a transmission processing unit 24, a transmission-outcome determining unit 25, a storage control unit 26, an authentication-web-page providing unit 27, and a history-display-web-page providing unit (a history-display-user-interface providing unit) 28.

In the facsimile transmission processing system 100, for example, a user causes the MFP 2 to read an image and transmits image data generated by the MFP 2 to the facsimile apparatus 1 by facsimile. The user views, with the client terminal 3, a history display web page (a history display user interface) provided by the MFP 2 and retransmits, using the transmission history web page, image data transmitted by facsimile in the past.

Figure 4:
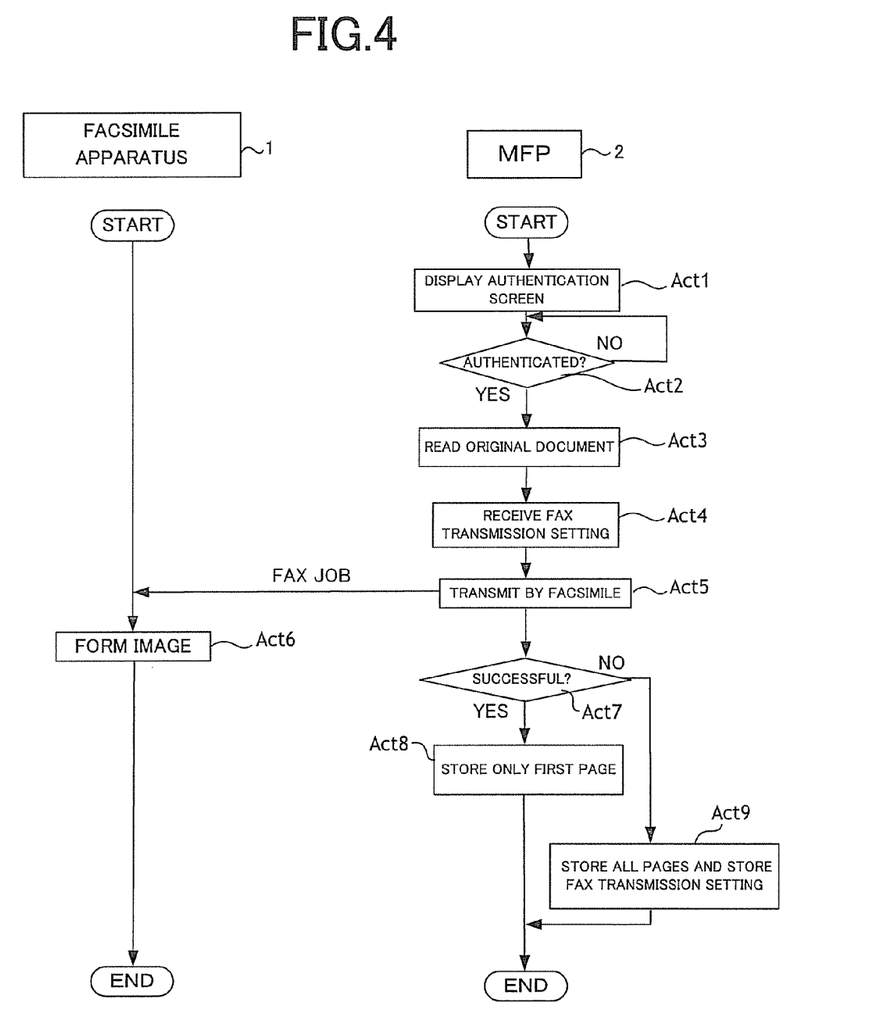
FIG. 4 is a flowchart of facsimile transmission processing for image data by the MFP.

A flow of processing performed by the facsimile apparatus 1 and the MFP 2 when the MFP 2 transmits image data generated by reading an original document to the facsimile apparatus 1 by facsimile is explained with reference to a flowchart of FIG. 4.

Figure 5:
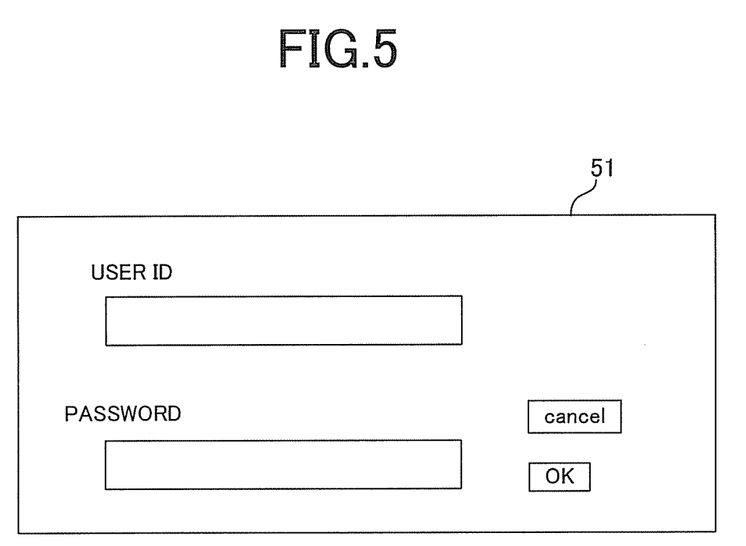
FIG. 5 is a diagram of an authentication screen.

The screen control unit 21 of the MFP 2 displays, on the display unit 201, an authentication screen 51 (FIG. 5) to which a user can input authentication information such as a user ID and a password (Act 1). Subsequently, the authenticating unit 22 authenticates the user on the basis of the authentication information input to the authentication screen 51 by the user (Act 2). The image-data generating unit 23 reads an original document with the image reading unit 207 and generates image data (Act 3).

The screen control unit 21 displays a facsimile transmission setting screen and receives facsimile transmission setting such as a telephone number, an e-mail address, and resolution (Act 4).

On the facsimile transmission setting screen, the user inputs the facsimile transmission setting and clicks a facsimile transmission button or the like for performing facsimile transmission processing. Then, the transmission processing unit 24 transmits a facsimile job including the facsimile transmission setting received on the facsimile transmission setting screen and the image data generated by the image reading unit 207 to the facsimile apparatus 1 by facsimile (Act 5). The facsimile apparatus 1 receives the facsimile job and forms an image on a sheet on the basis of the facsimile job (Act 6).

After Act 5, the transmission-outcome determining unit 25 of the MFP 2 determines whether communication between the MFP 2 and the facsimile apparatus 1 is established and the facsimile transmission processing is successful (Act 7). If the transmission-outcome determining unit 25 determines that the facsimile transmission processing is successful (YES in Act 7), the storage control unit 26 causes the memory 205 to store only a first page of the image data transmitted by facsimile and causes the memory 205 to store the user, the image data, an image data name, date and time of the facsimile transmission processing, and indication of the successful facsimile transmission processing in association with one another (Act 8).

If the transmission-outcome determining unit 25 determines that the facsimile transmission processing is unsuccessful because, for example, the communication between the MFP 2 and the facsimile apparatus 1 cannot be established (NO in Act 7), the storage control unit 26 causes the memory 205 to store all pages of the image data unsuccessfully transmitted by facsimile and causes the memory 205 to store the user, the image data, the image data name, the date and time of the facsimile transmission processing, indication of the unsuccessful facsimile transmission processing, and the facsimile transmission setting in the transmission of the image data in association with one another (Act 9).

Figure 6:
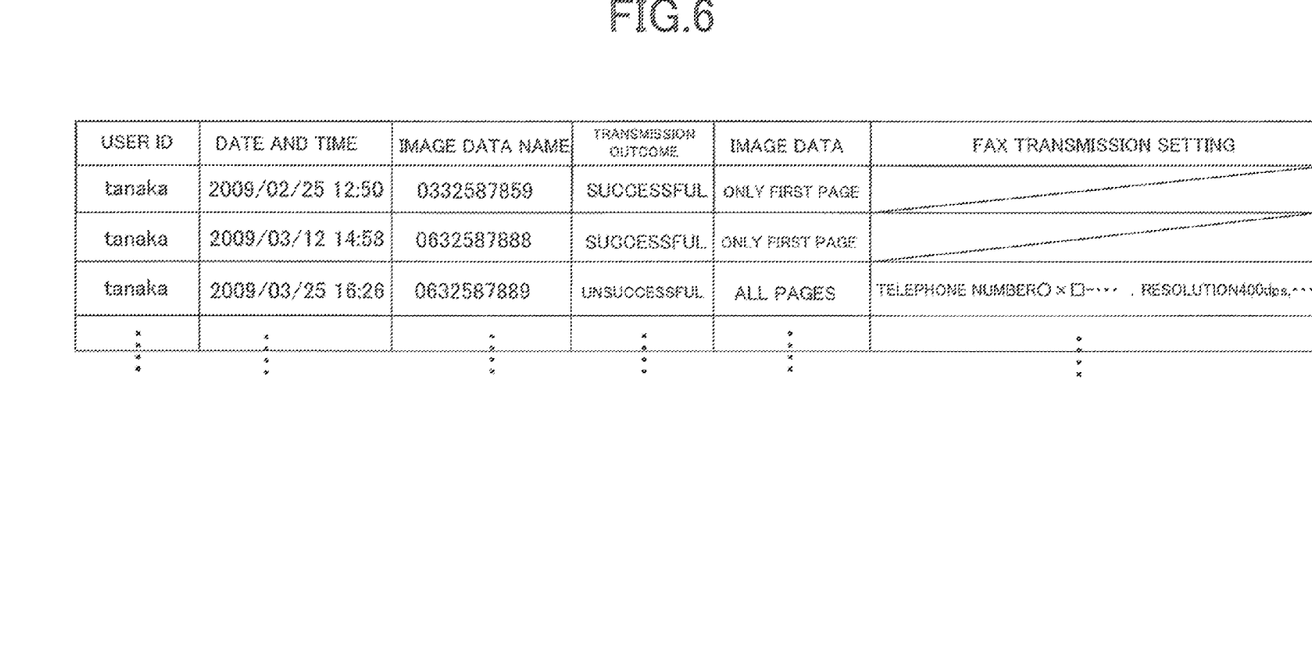
FIG. 6 is a diagram of a history of the facsimile transmission processing.

According to the processing explained above, as shown in FIG. 6, the memory 205 stores a history of facsimile transmission processing corresponding to the outcome of respective kinds of facsimile transmission processing, i.e., a history of facsimile transmission processing peculiar to an authenticated user.

Figure 7:
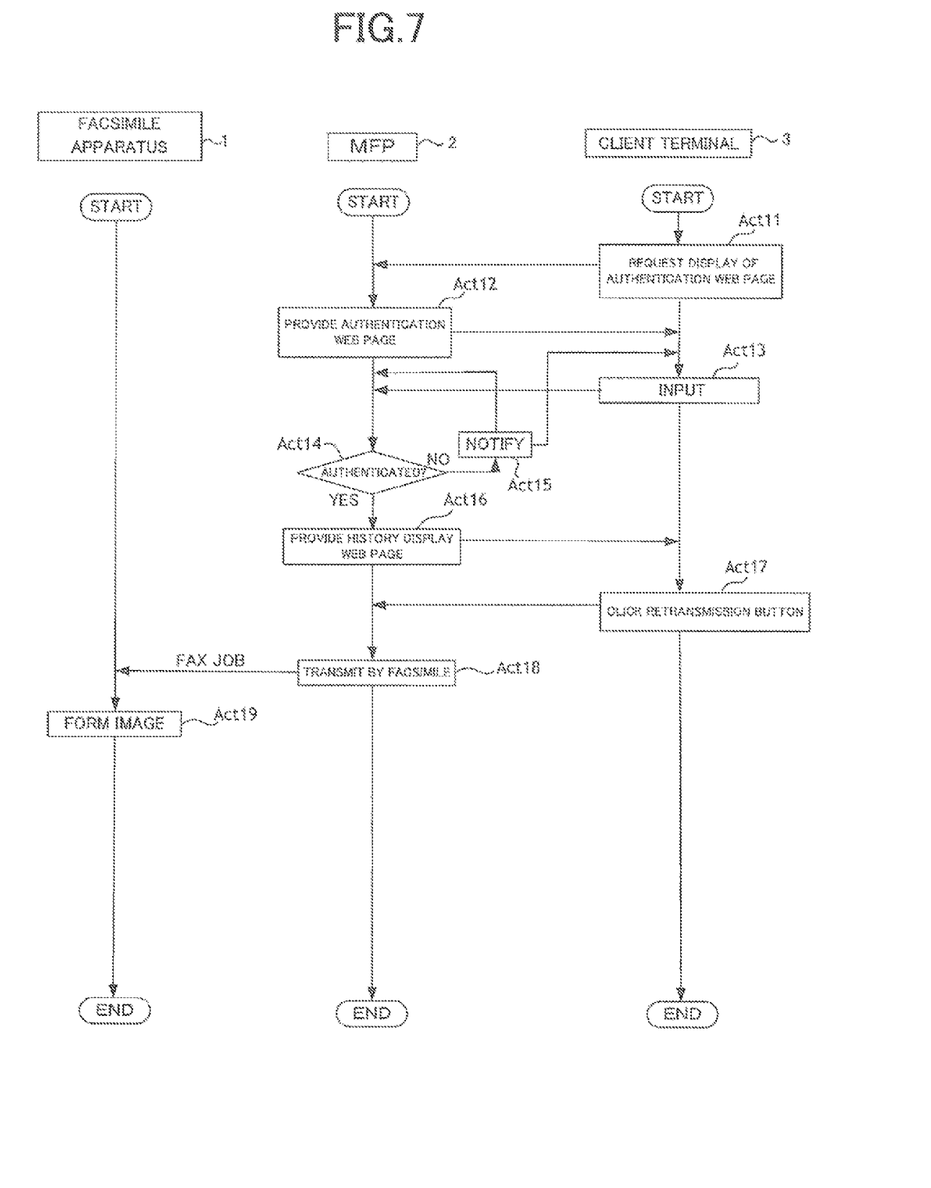
FIG. 7 is a flowchart for explaining retransmission processing for image data by the facsimile transmission processing system.

A flow of processing performed by the facsimile apparatus 1, the MFP 2, and the client terminal 3 when the client terminal 3 retransmits image data transmitted by facsimile in the past using a transmission history web page provided by the MFP 2 is explained with reference to a flowchart of FIG. 7.

When the client terminal 3 requests the MFP 2 to display an authentication web page (Act 11), the authentication-web-page providing unit 27 of the MFP 2 provides the client terminal 3 with an authentication web page same as the authentication screen 51 to which a user can input authentication information such as a user ID and a password (Act 12). Web pages such as the authentication web page are described in a language such as HTML (Hyper Text Markup Language) by the MFP 2.

After Act 12, when the client terminal 3 transmits the authentication information to the MFP 2 using the authentication web page (Act 13), the authenticating unit 22 of the MFP 2 authenticates the user (YES in Act 14). If the authenticating unit 22 does not authenticate the user (NO in Act 14), the MFP 2 notifies the client terminal 3 that the user is not authenticated (Act 15). Acts 13 to 15 are repeated.

Figure 8:
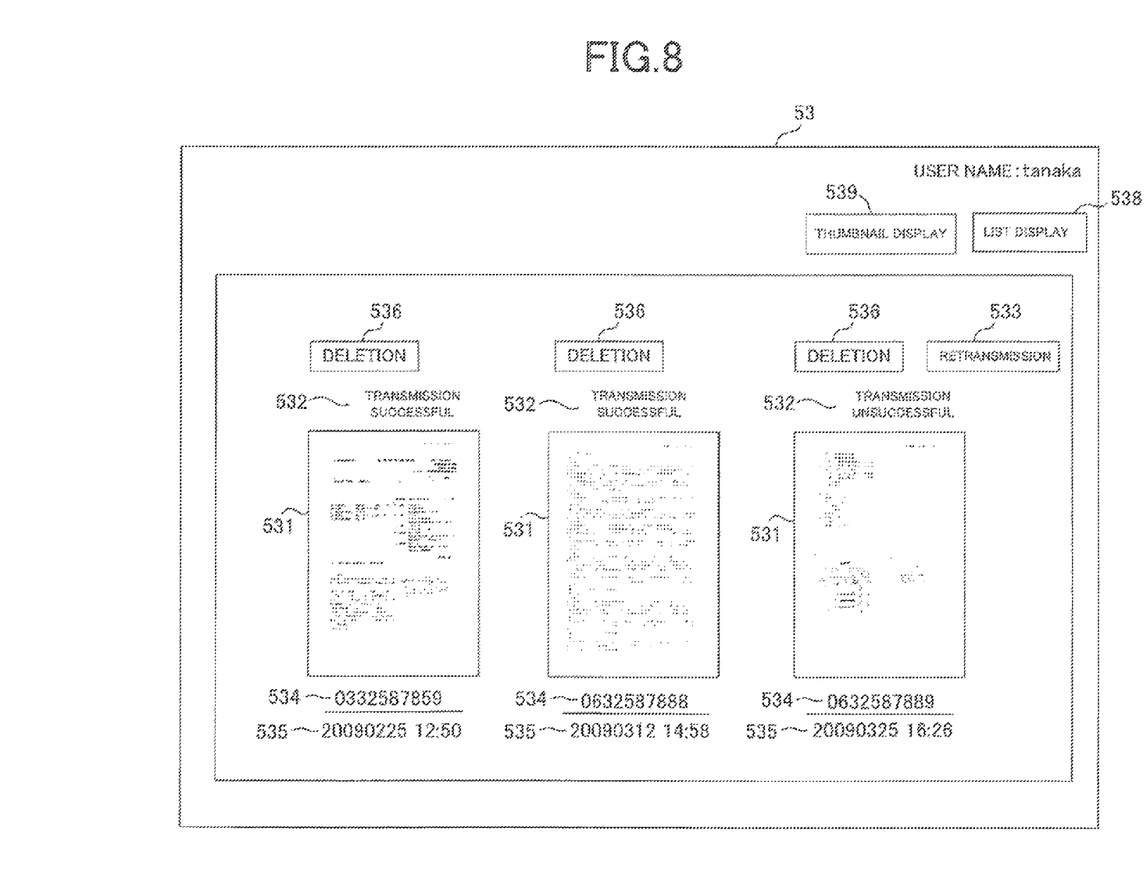
FIG. 8 is a diagram of a history display web page.

After the authenticating unit 22 authenticates the user, the history-display-web-page providing unit 28 acquires a history of facsimile transmission processing peculiar to the authenticated user from the memory 205. In other words, the history-display-web-page providing unit 28 acquires image data transmitted by facsimile and the outcome of the facsimile transmission processing from the memory 205. As shown in FIG. 8, the history-display-web-page providing unit 28 provides the client terminal 3 with a history display web page 53 that displays thumbnail images 531 of the image data transmitted by facsimile and outcome information 532 indicating the outcome of the facsimile transmission processing in association with each other and displays a retransmission button 533 in association with the thumbnail images 531 of the image data unsuccessfully transmitted by facsimile (Act 16). The history-display-web-page providing unit 28 displays an image data name 534 corresponding to the image data related to the thumbnail images 531 and date and time 535 of the facsimile transmission processing in association with the thumbnail images 531.

The history-display-web-page providing unit 28 displays deletion buttons 536 in association with the thumbnail images 531. If the client terminal 3 selects and clicks the deletion button 536, the storage control unit 26 of the MFP 2 deletes the image data related to the thumbnail image 531 corresponding to the deletion button 536 from the memory 205. The history-display-web-page providing unit 28 displays a list display button 538 and a thumbnail display button 539. If the client terminal 3 selects and clicks the list display button 538, the history-display-web-page providing unit 28 switches the history display web page 53 from thumbnail display shown in FIG. 8 to list display shown in FIG. 9. In the list display, a history of the facsimile transmission processing not including the image transmitted by facsimile but including the outcome information of the facsimile transmission processing is list-displayed.

Figure 9:
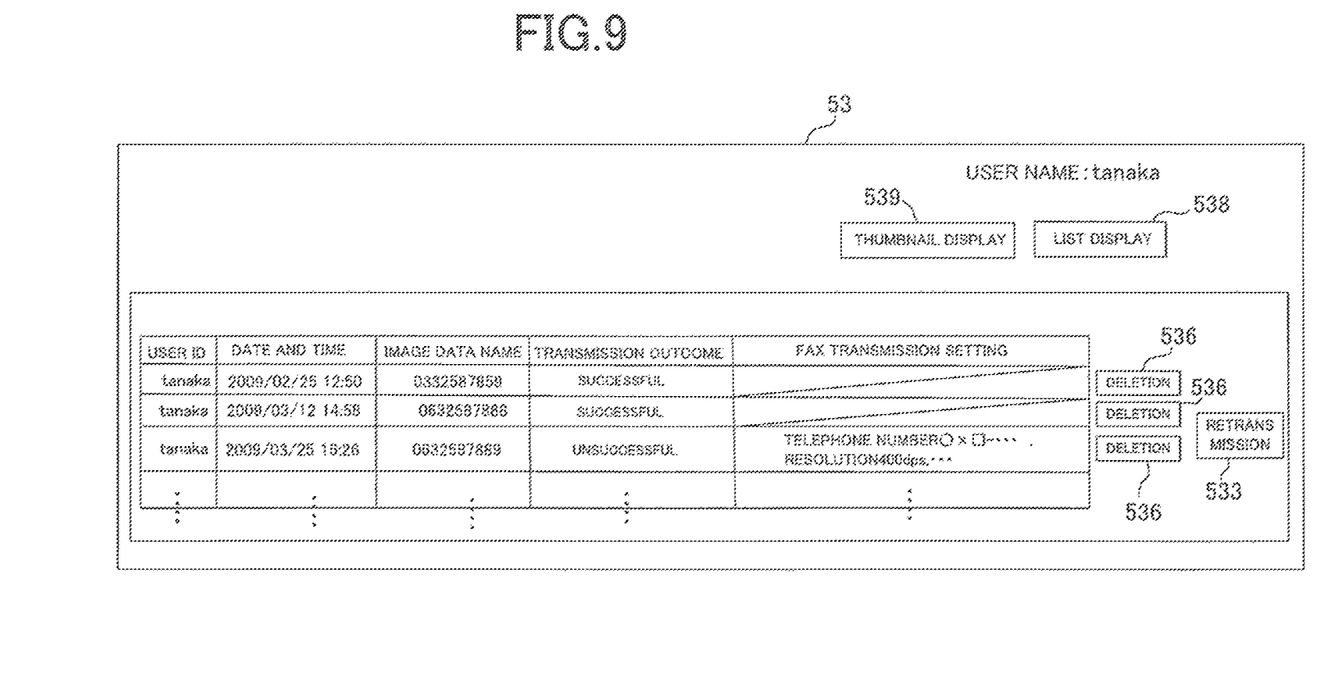
FIG. 9 is a diagram of the history display web page switched to the list display.
Figure 10:
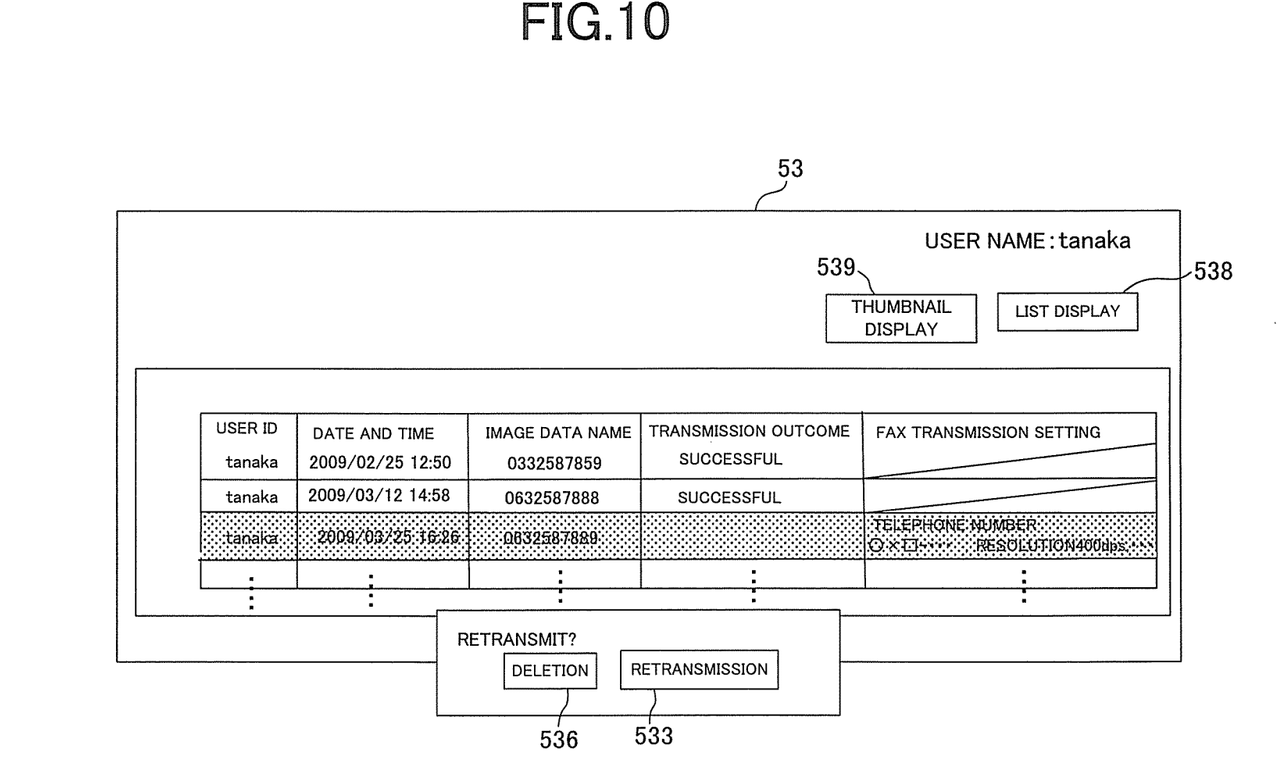
FIG. 10 is a diagram of a modification of list display of a history.

The history-display-web-page providing unit 28 displays the retransmission button (a retransmission button for list display) 533 in association with a history of unsuccessful facsimile transmission processing, for example, on the history display web page 53 switched to the list display. As shown in FIG. 10, for example, if a history is selected, the history-display-web-page providing unit 28 may display, in a popup manner or the like, the retransmission button 533 corresponding to the history of unsuccessful facsimile transmission processing and the deletion button 536 corresponding to the selected history. Consequently, the user can retransmit image data related to the history of unsuccessful facsimile transmission processing and delete the selected history even in the history display web page 53 switched to the list display. After Act 16, if the client terminal 3 selects and clicks the retransmission button 533 on the history display web page 53, the transmission processing unit 24 of the MFP 2 transmits a facsimile job including the image data corresponding to the thumbnail image 531 related to the retransmission button 533 and facsimile transmission setting corresponding to the image (Act 18). The facsimile apparatus 1 receives the facsimile job and forms an image on a sheet on the basis of the facsimile job (Act 19).

Second Embodiment

In explanation of a second embodiment below, functional components same as those in the first embodiment are denoted by the same reference numerals and signs and explanation of the components is omitted.

Figure 11:
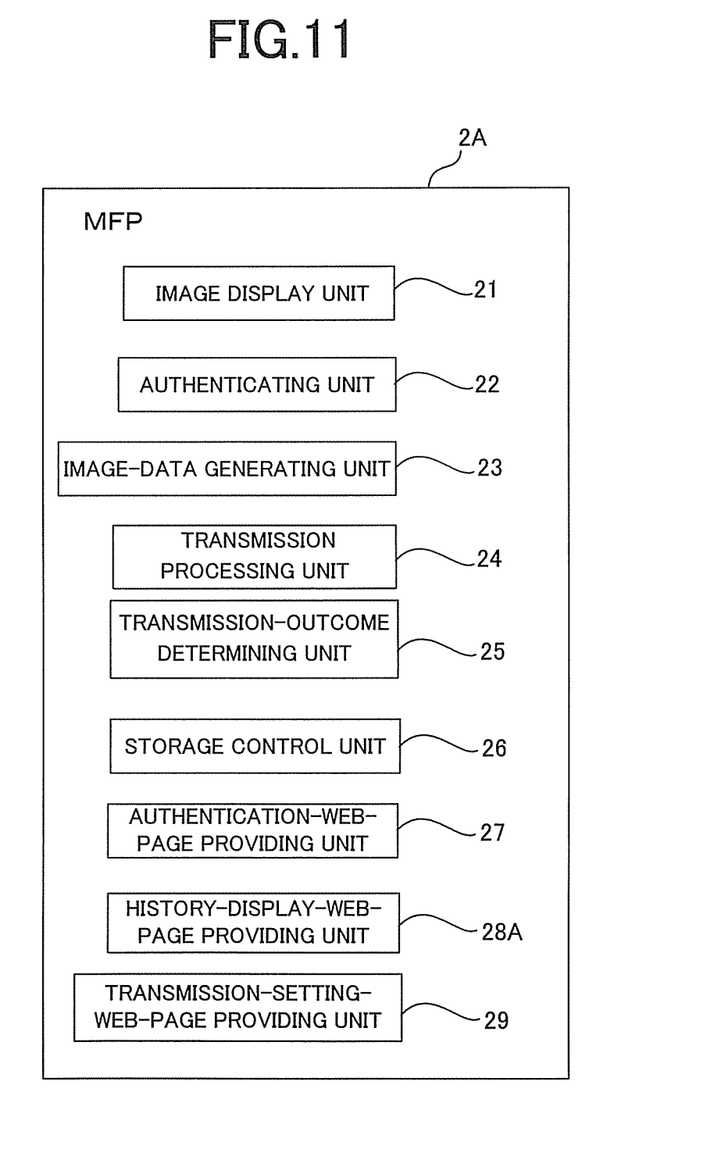
FIG. 11 is a block diagram of functional units of a MFP according to a second embodiment.
Figure 12:
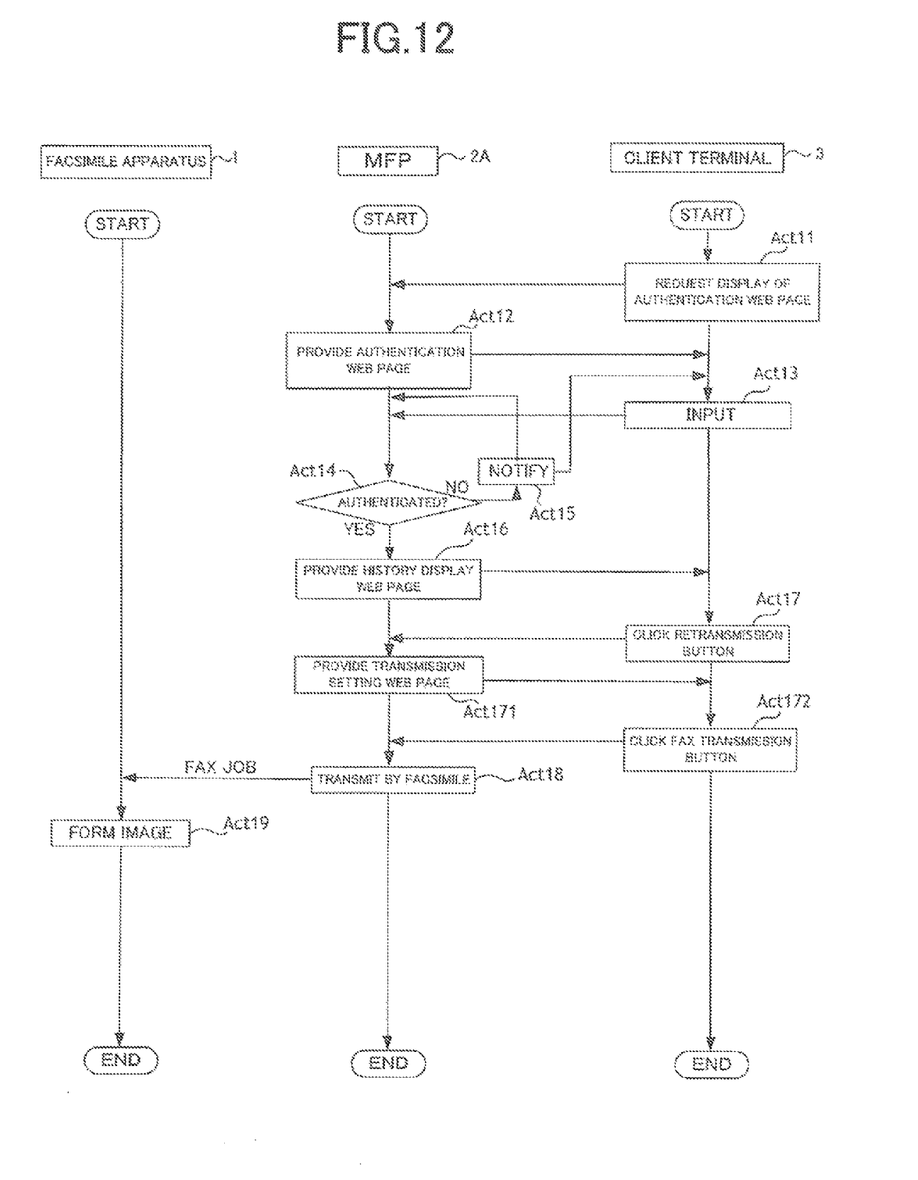
FIG. 12 is a flowchart for explaining retransmission processing by a facsimile transmission system.

FIG. 11 is a block diagram of functional units of a MFP 2A. FIG. 12 is a flowchart for explaining a flow of processing performed by the facsimile apparatus 1, the MFP 2A, and the client terminal 3 when image data unsuccessfully transmitted by facsimile is retransmitted.

In this embodiment, the MFP 2A includes, besides the functional units 21 to 27 same as those in the first embodiment, a history-display-web-page providing unit 28A and a transmission-setting-web-page providing unit (a transmission-setting-user-interface providing unit) 29.

Figure 13:
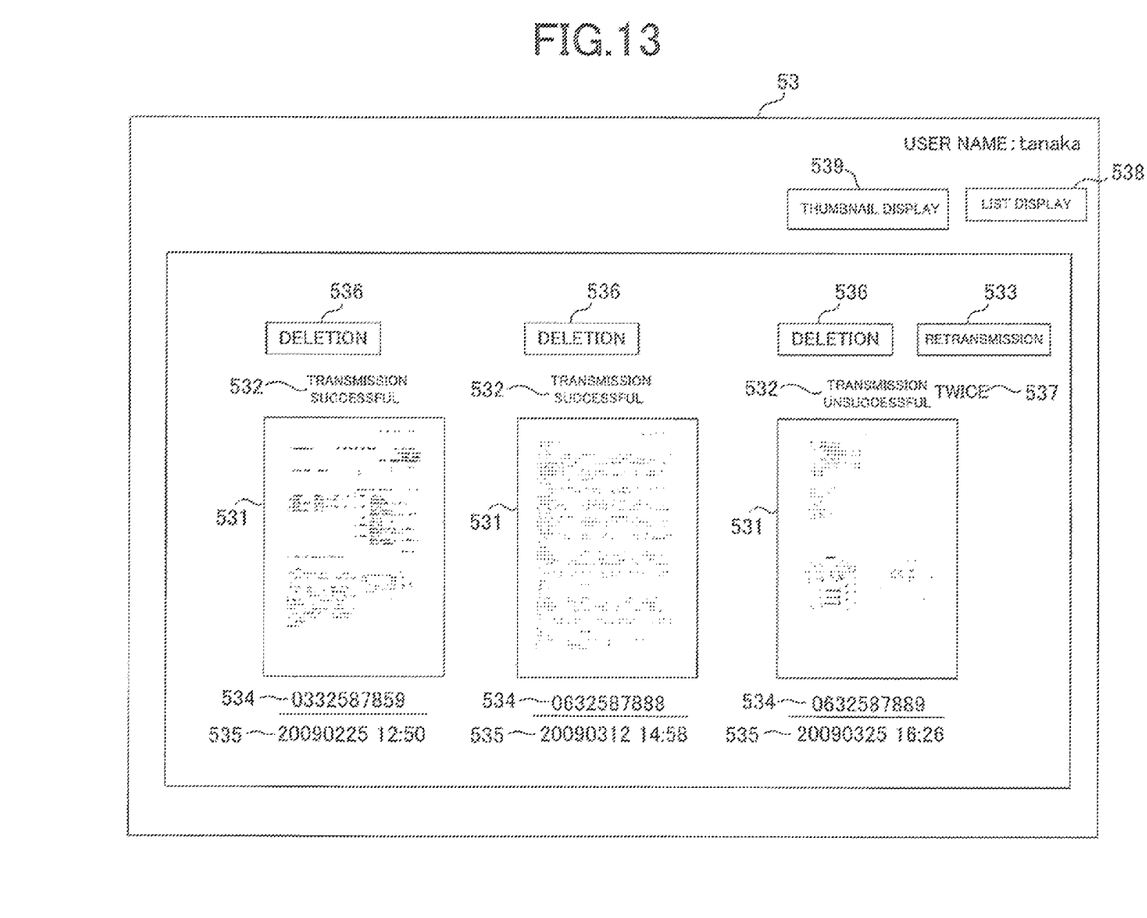
FIG. 13 is a diagram of a history display web page.

The history-display-web-page providing unit 28A acquires a history of facsimile transmission processing peculiar to the authenticated user from the memory 205. The history-display-web-page providing unit 28A counts the number of times of unsuccessful facsimile transmission processing concerning the same image data and, as shown in FIG. 13, displays number-of-times information 537 in association with the thumbnail image 531 of the image data (Act 16A).

If the number of times of unsuccessful facsimile transmission processing is large, it is likely that a telephone number or an e-mail address set as a destination is wrong.

Therefore, if the client terminal 3 clicks the retransmission button 533 corresponding to the thumbnail image 531 related to the image data (Act 17), the transmission-setting-web-page providing unit 29 provides the client terminal 3 with a transmission setting web page (a transmission setting user interface) in which facsimile transmission setting such as the destination can be changed (Act 171).

The client terminal 3 inputs facsimile transmission setting such as a destination again in the transmission setting web page and selects and clicks the facsimile transmission button or the like (Act 172). Then, the transmission processing unit 24 of the MFP 2A transmits a facsimile job to the facsimile apparatus 1 by facsimile according to the changed facsimile transmission setting such as the destination (Act 18).

In this embodiment, after the client terminal 3 selects image data to be retransmitted, the transmission setting web page in which the facsimile transmission setting such as the destination can be changed is provided to the client terminal 3. Therefore, if the number of times of unsuccessful facsimile transmission processing is large, in some case, the facsimile transmission processing can be normally performed by changing the destination.

In the embodiments explained above, simply by selecting and clicking the retransmission button 533 in the history display web page 53, it is possible to easily retransmit image data unsuccessfully transmitted by facsimile. In the history display web page 53, the thumbnail images 531 of image data transmitted by facsimile are displayed as a list. Therefore, it is possible to check the thumbnail image 531 of image data unsuccessfully transmitted by facsimile and easily determine whether it is necessary to retransmit the image data.

Modifications

In the embodiments, the MFP 2 provides the client terminal 3 with the history display web page 53. However, the MFP 2 may display (provide) the history display web page 53 on the display unit 201 of the MFP 2. Specifically, the MFP 2 itself that fails in facsimile transmission processing may display the history display web page 53 on the display unit 201 of the MFP 2 and perform the facsimile transmission processing again when the history display web page 53 is operated.

In the embodiments, the server is the MFP 2 or 2A connected to the client terminal 3 via the electric communication line 42 such as a LAN. However, the server does not have to be the MFP 2 or 2A and may be a dedicated server connected to the client terminal 3 via the electric communication line 41 such as a telephone line or the Internet.

The MFP 2 or 2A may be configured to be capable of grasping a cause of unsuccessful facsimile transmission processing to the facsimile apparatus 1, for example, a cause such as incapability of establishment of a communication line or invalidity of a telephone number or an e-mail address set as a destination. Further, the MFP 2 or 2A may be configured to notify the user that the user should perform facsimile transmission setting to avoid the cause on the transmission setting web page.

A form of a recording medium may be any form as long as the recording medium can store a computer program and can be read by a computer. Specifically, examples of the recording medium include an internal storage device internally mounted in a computer such as a ROM or a RAM, a portable storage medium such as a CD-ROM, a flexible disk, a DVD disk, a magneto-optical disk, or an IC card, a database that stores a computer program, and other computers and databases of the computers. A function obtained by installation or download may be realized in cooperation with an OS or the like in the apparatus. The computer program may be an execution module dynamically generated partially or entirely.

The order of the respective kinds of processing in the embodiments may be different from the order explained in the embodiments.

As explained above in detail, with the technique described in this specification, it is possible to provide a facsimile transmission processing technique for transmitting image data by facsimile again.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A facsimile job managing apparatus comprising:
a storing unit;
a storage control unit configured to cause the storing unit to store image data transmitted by facsimile and an outcome of the facsimile transmission processing in association with each other;
a history-display-user-interface providing unit configured to provide a history display user interface for acquiring the image data transmitted by facsimile and the outcome of the facsimile transmission processing from the storing unit and displaying a thumbnail image of the image data transmitted by facsimile, outcome information indicating the outcome of the facsimile transmission processing in association with the thumbnail image of the image data transmitted and a retransmission button in association with a thumbnail image of image data unsuccessfully transmitted by facsimile at the same time; and
a transmission processing unit configured to transmit, if the retransmission button is selected, image data corresponding to a thumbnail image related to the retransmission button by facsimile.

2. The apparatus according to claim 1, wherein
the storage control unit causes the storing unit to store only image data of a first page of image data successfully transmitted by facsimile, causes the storing unit to store image data of all pages of image data unsuccessfully transmitted by facsimile, and causes the storing unit to store the image data unsuccessfully transmitted by facsimile and facsimile transmission setting of the image data unsuccessfully transmitted by facsimile in association with each other, and
the transmission processing unit acquires the facsimile transmission setting of the image data unsuccessfully transmitted by facsimile from the storing unit and transmits, if the retransmission button is selected, the image data corresponding to the thumbnail image related to the retransmission button by facsimile according to the facsimile transmission setting at the time of unsuccessful facsimile transmission processing of the image data, which is the facsimile transmission setting acquired from the storing unit.

3. The apparatus according to claim 1, further comprising a transmission-setting-user-interface providing unit configured to provide, if the retransmission button is selected, a transmission setting user interface for receiving facsimile transmission setting for facsimile transmission processing, wherein
the transmission processing unit transmits image data by facsimile according to the facsimile transmission setting received in the transmission setting user interface.

4. The apparatus according to claim 1, wherein the storage control unit causes the storing unit to store only image data of a first page of the image data successfully transmitted by facsimile and causes the storing unit to store image data of all pages of the image data unsuccessfully transmitted by facsimile.

5. The apparatus according to claim 1, wherein the history-display-user-interface providing unit counts a number of times of unsuccessful facsimile transmission processing concerning same image data and provides the history display user interface in which the number of times is associated with a thumbnail image of the image data.

6. The apparatus according to claim 1, wherein
the history-display-user-interface providing unit provides the history display user interface including a thumbnail display button and a list display button, provides, if the list display button is selected, a user interface for list-displaying a history of facsimile transmission processing not including an image transmitted by facsimile but including the outcome information and displays a retransmission button for list display corresponding to a history of unsuccessful facsimile transmission processing, and provides, if the thumbnail display button is selected, the history display user interface, and
the transmission processing unit transmits, if the retransmission button for list display is selected, image data corresponding to a history related to the retransmission button for list display by facsimile.

7. A facsimile transmission processing method by a facsimile job managing apparatus including a storing unit, the method comprising:
causing the storing unit to store image data transmitted by facsimile and an outcome of the facsimile transmission processing in association with each other;
providing a client terminal with a history display user interface for acquiring the image data transmitted by facsimile and the outcome of the facsimile transmission processing from the storing unit and displaying a thumbnail image of the image data transmitted by facsimile, outcome information indicating the outcome of the facsimile transmission processing in association with the thumbnail image of the image data transmitted and a retransmission button in association with a thumbnail image of image data unsuccessfully transmitted by facsimile at the same time; and
transmitting, if the retransmission button is selected in the client terminal, image data corresponding to a thumbnail image related to the retransmission button by facsimile.

8. The method according to claim 7, further comprising:
causing the storing unit to store only image data of a first page of image data successfully transmitted by facsimile, causing the storing unit to store image data of all pages of image data unsuccessfully transmitted by facsimile, and causing the storing unit to store the image data unsuccessfully transmitted by facsimile and facsimile transmission setting of the image data unsuccessfully transmitted by facsimile in association with each other, and acquiring the facsimile transmission setting of the image data unsuccessfully transmitted by facsimile from the storing unit and transmitting, if the retransmission button is selected in the client terminal, the image data corresponding to the thumbnail image related to the retransmission button by facsimile according to the facsimile transmission setting at the time of unsuccessful facsimile transmission processing of the image data, which is the facsimile transmission setting acquired from the storing unit.

9. The method according to claim 7, further comprising:
providing, if the retransmission button is selected in the client terminal, the client terminal with a transmission setting user interface for receiving facsimile transmission setting for facsimile transmission processing; and transmitting image data by facsimile according to the facsimile transmission setting received in the transmission setting user interface.

10. The method according to claim 7, further comprising causing the storing unit to store only image data of a first page of the image data successfully transmitted by facsimile and causing the storing unit to store image data of all pages of the image data unsuccessfully transmitted by facsimile.

11. The method according to claim 7, further comprising counting a number of times of unsuccessful facsimile transmission processing concerning same image data and providing the history display user interface in which the number of times is associated with a thumbnail image of the image data.

12. The method according to claim 7, further comprising:
providing the history display user interface including a thumbnail display button and a list display button;

providing, if the list display button is selected in the client terminal, a user interface for list-displaying a history of facsimile transmission processing not including an image transmitted by facsimile but including the outcome information and displaying a retransmission button for list display corresponding to a history of unsuccessful facsimile transmission processing;

providing, if the thumbnail display button is selected in the client terminal, the history display user interface, and transmitting, if the retransmission button for list display is selected in the client terminal, image data corresponding to a history related to the retransmission button for list display by facsimile.

13. A facsimile transmission processing system comprising:
a server including:
a storing unit;
a storage control unit configured to cause the storing unit to store image data transmitted by facsimile and an outcome of the facsimile transmission processing in association with each other;
a history-display-user-interface providing unit configured to provide a client terminal with a history display user interface for acquiring the image data transmitted by facsimile and the outcome of the facsimile transmission processing from the storing unit and displaying a thumbnail image of the image data transmitted by facsimile, outcome information indicating the outcome of the facsimile transmission processing in association with the thumbnail image of the image data transmitted and a retransmission button in association with a thumbnail image of image data unsuccessfully transmitted by facsimile at the same time; and
a transmission processing unit configured to transmit, if the retransmission button is selected, image data corresponding to a thumbnail image related to the retransmission button by facsimile;
the client terminal configured to select a retransmission button in a history display user interface provided by the server and causes the server to transmit image data corresponding to a thumbnail image related to the selected retransmission button by facsimile; and
a facsimile apparatus configured to receive the image data transmitted by facsimile by the server and form an image on a sheet on the basis of the image data.

14. The system according to claim 13, wherein
the storage control unit causes the storing unit to store only image data of a first page of image data successfully transmitted by facsimile, causes the storing unit to store image data of all pages of image data unsuccessfully transmitted by facsimile, and causes the storing unit to store the image data unsuccessfully transmitted by facsimile and facsimile transmission setting of the image data unsuccessfully transmitted by facsimile in association with each other, and
the transmission processing unit acquires the facsimile transmission setting of the image data unsuccessfully transmitted by facsimile from the storing unit and transmits, if the retransmission button is selected in the client terminal, the image data corresponding to the thumbnail image related to the retransmission button by facsimile according to the facsimile transmission setting at the time of unsuccessful facsimile transmission processing of the image data, which is the facsimile transmission setting acquired from the storing unit.

15. The system according to claim 13, further comprising a transmission-setting-user-interface providing unit configured to provide, if the retransmission button is selected in the client terminal, the client terminal with a transmission setting user interface for receiving facsimile transmission setting for facsimile transmission processing, wherein
the transmission processing unit transmits image data by facsimile according to the facsimile transmission setting received in the transmission setting user interface.

16. The system according to claim 13, wherein the storage control unit causes the storing unit to store only image data of a first page of the image data successfully transmitted by facsimile and causes the storing unit to store image data of all pages of the image data unsuccessfully transmitted by facsimile.

17. The system according to claim 13, wherein the history-display-user-interface providing unit counts a number of times of unsuccessful facsimile transmission processing concerning same image data and provides the history display user interface in which the number of times is associated with a thumbnail image of the image data.

18. The system according to claim 13, wherein
the history-display-user-interface providing unit provides the history display user interface including a thumbnail display button and a list display button, provides, if the list display button is selected in the client terminal, a user interface for list-displaying a history of facsimile transmission processing not including an image transmitted by facsimile but including the outcome information and displays a retransmission button for list display corresponding to a history of unsuccessful facsimile transmission processing, and provides, if the thumbnail display button is selected in the client terminal, the history display user interface, and the transmission processing unit transmits, if the retransmission button for list display is selected in the client terminal, image data corresponding to a history related to the retransmission button for list display by facsimile.

* * * * *